US009449298B2

(12) United States Patent
Lowry et al.

(10) Patent No.: US 9,449,298 B2
(45) Date of Patent: Sep. 20, 2016

(54) MANAGING COMPLEX DEPENDENCIES IN A FILE-BASED TEAM ENVIRONMENT

(75) Inventors: Lee Edward Lowry, Orem, UT (US);
Rajesh Vasudevan, Sandy, UT (US);
Brent Thurgood, Spanish Fork, UT (US); Ryan Cox, Provo, UT (US);
Zack Grossbart, Cambridge, MA (US);
William Street, Orem, UT (US);
Volker Gunnar Scheuber-Heinz, Pleasant Grove, UT (US); Stephen R Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 2575 days.

(21) Appl. No.: 12/119,555

(22) Filed: May 13, 2008

(65) Prior Publication Data

US 2010/0095268 A1    Apr. 15, 2010

(51) Int. Cl.
*G06F 17/30* (2006.01)
*G06Q 10/10* (2012.01)

(52) U.S. Cl.
CPC .................................. *G06Q 10/10* (2013.01)

(58) Field of Classification Search
CPC ....... G06F 8/20; G06Q 10/10; G06Q 10/101
See application file for complete search history.

(56) References Cited

U.S. PATENT DOCUMENTS

| | | | |
|---|---|---|---|
| 5,805,899 A * | 9/1998 | Evans et al. | 717/170 |
| 5,987,471 A * | 11/1999 | Bodine et al. | |
| 5,995,753 A * | 11/1999 | Walker | 717/108 |
| 6,122,664 A * | 9/2000 | Boukobza et al. | 709/224 |
| 6,151,605 A * | 11/2000 | Costa | 717/163 |
| 6,256,773 B1 * | 7/2001 | Bowman-Amuah | 717/121 |
| 6,510,551 B1 * | 1/2003 | Miller | 717/114 |
| 6,539,438 B1 * | 3/2003 | Ledzius et al. | 710/8 |
| 6,658,659 B2 * | 12/2003 | Hiller et al. | 717/170 |
| 6,772,168 B2 | 8/2004 | Ardoin et al. | |
| 7,039,621 B2 | 5/2006 | Agrafiotis et al. | |
| 7,051,043 B2 | 5/2006 | Cameron et al. | |
| 7,139,739 B2 | 11/2006 | Agrafiotis et al. | |
| 7,231,400 B2 | 6/2007 | Cameron et al. | |
| 7,246,136 B2 | 7/2007 | Cameron et al. | |
| 7,290,007 B2 | 10/2007 | Farber et al. | |
| 7,457,809 B2 * | 11/2008 | Bennetto et al. | |
| 7,752,603 B2 * | 7/2010 | Harutunian et al. | 717/121 |
| 7,788,238 B2 * | 8/2010 | Gabriel et al. | 707/695 |
| 8,069,129 B2 * | 11/2011 | Gould et al. | 706/47 |
| 8,140,501 B2 * | 3/2012 | Wu et al. | 707/705 |
| 2003/0084437 A1 * | 5/2003 | Cashin et al. | 717/174 |
| 2005/0065972 A1 * | 3/2005 | Haines et al. | 707/103 R |
| 2005/0149539 A1 | 7/2005 | Cameron et al. | |
| 2006/0101038 A1 * | 5/2006 | Gabriel et al. | 707/100 |

(Continued)

OTHER PUBLICATIONS

Herman, Ivan, "Web Ontology Language (OWL)", http://www.w3.org/2004/OWL/, (Oct. 15, 2007).

*Primary Examiner* — Li B Zhen
*Assistant Examiner* — Viva Miller
(74) *Attorney, Agent, or Firm* — Barry N. Young

(57) ABSTRACT

Techniques managing complex dependencies in a file-based team environment are provided. A software module is represented as an object. The object is defined via a file. The file includes relationships, and some of the relationships define dependencies to other objects. In some cases, attributes for the object are also included in the file and are defined via references to still other objects. The relationships and the attributes are carried with the object via the file.

25 Claims, 4 Drawing Sheets

(56) References Cited

U.S. PATENT DOCUMENTS

| | | |
|---|---|---|
| 2006/0112083 A1 | 5/2006 | Takase et al. |
| 2006/0212879 A1* | 9/2006 | Bennetto et al. ............ 719/328 |
| 2007/0083347 A1 | 4/2007 | Bollobas |
| 2008/0065592 A1 | 3/2008 | Doyle |
| 2010/0088671 A1* | 4/2010 | Rentsch et al. ............... 717/108 |
| 2010/0198799 A1* | 8/2010 | Krishnan et al. ............ 707/702 |

* cited by examiner

MANAGING COMPLEX DEPENDENCIES IN A FILE-BASED TEAM ENVIRONMENT

BACKGROUND

Collaborative environments are becoming pervasive in the industry. One area of collaboration that is critical to an enterprise is that which is associated with new software development. During software development a variety of different developers can be working on the same or dependent modules at the same time and from entirely different processing environments from one another. A variety of different project life-cycle and version control systems attempt to coordinate project activities in scenarios such as this.

The problem with these approaches is that they are either holistic or monolithic implementations. In other words, if a dependency exists in a piece of software code being worked on by one team member then if that same code is not available, other downstream members are forestalled from working on their pieces of software code even when they do not use the piece of code that is not available. So, existing solutions require relationships between code modules; the relationships are carried for the whole project in a centralized fashion (holistic or monolithic).

Modeling individual pieces of code in a version-controlled or collaborative environment is also straightforward and not an issue when the traditional holistic approach is used. However, most developers work on projects that have a complex web or relationships with one another. So, when the conventional mechanisms are used there is a lot of wasted effort, down time, etc. Furthermore, communication snafus during project management occur when dependencies are missing and this can cause failures to erupt or can cause long unnecessary project delays to ensue.

Most pieces of software use some sort of underlying data model to store its information. The information is usually stored in one of three ways: a database, independent files, and/or highly coupled files that are linked together. As discussed above, enterprises often have a great need to share the model information so that the enterprise departments and resources can collaborate on projects and leverage the individual pieces of software available within the enterprise to perform tasks in a streamlined and automated manner. To make this work the database or files are often stored and accessible to users via a central machine or server of an enterprise's network. Another way to make this work is to permit copies of the database or the files to be made on an individual basis. But, this creates substantial maintenance and support issues within the enterprises as multiple different copies of the database and the files proliferate around the enterprise environment.

Another issue is that typically the enterprise wants some mechanism to version a model at certain points in time so that a specific version of a model can be return to when needed. For enterprise's having a complex web of relationships between software modules (dependent linkages between modules) there exists no practical off-the-shelf product that can supply this solution. As a result, enterprises often develop their own internal and ad hoc approaches or forgo any attempt to have a viable versioning solution.

Thus, what is needed are improved techniques for managing complex software dependencies in file-based team environments.

SUMMARY

In various embodiments, techniques for managing complex software dependencies in file-based team environments are provided. More specifically, and in an embodiment, a method is provided for managing complex object dependencies in a team-based project environment. A file is created that defines characteristics of a software module that executes as instructions on a machine. The software module is represented as an object. Multiple relationships are defined between the object and other objects associated with a team-based project environment within the file. Subsequently, an instance of the object is instantiated within the team-based project environment and the object is configured on the machine in response to the relationships defined in the file.

DETAILED DESCRIPTION

Figure 1:
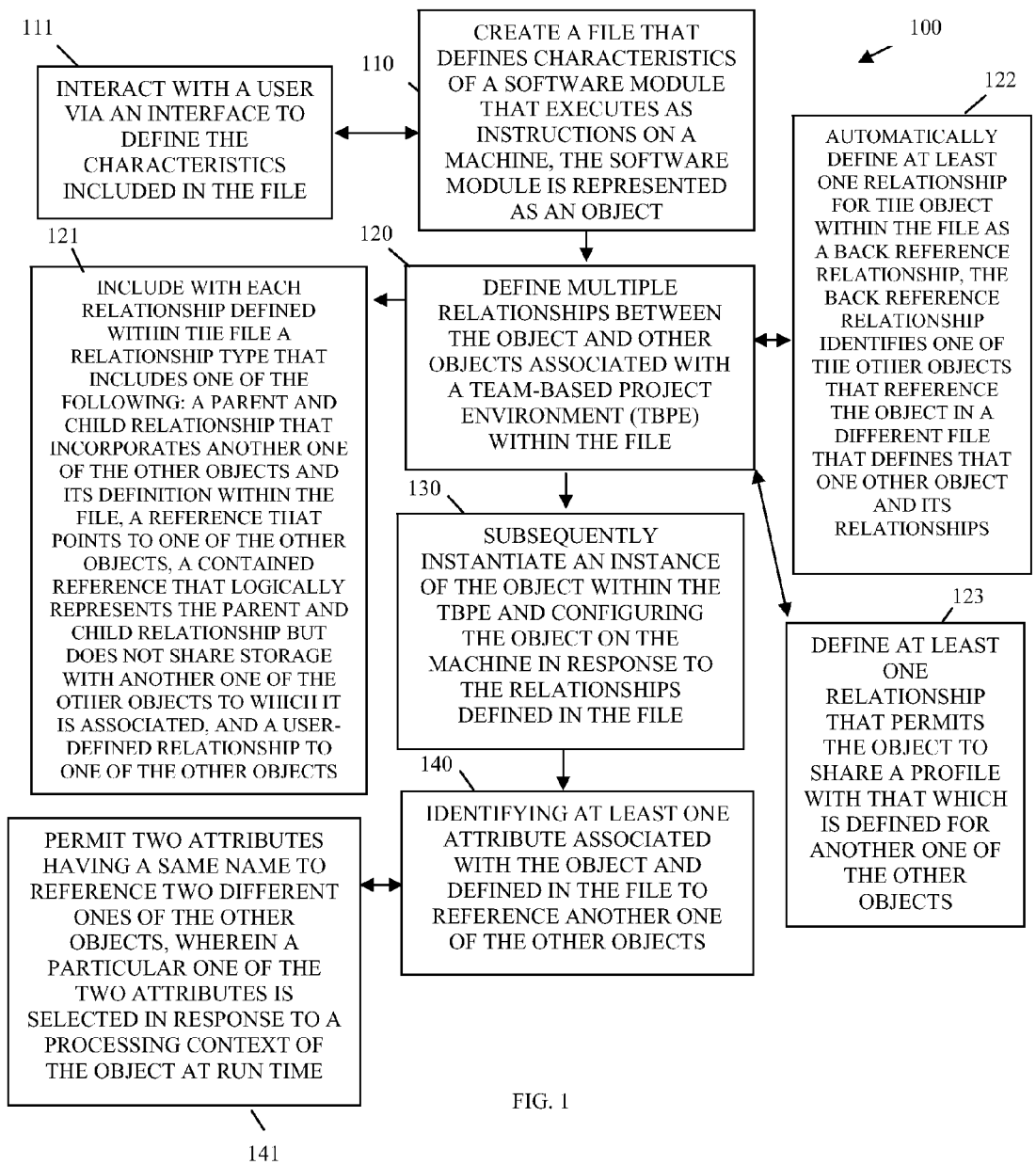
FIG. 1 is a diagram of a method for managing complex object dependencies in a team-based project environment, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "software module" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

Objects are shared, versioned, and managed via various projects and various processing environments within an enterprise. As will be described more completely herein and below, each object also defines a complex web of relationships with other objects within a project and team-enabled environment.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for managing complex object dependencies in a team-based project environment, according to an example embodiment. The method 100 (hereinafter "object relationship editor service") is implemented as instructions in a machine-accessible and readable medium. The instructions when executed by a machine (processor and memory enabled device) perform the processing depicted in the FIG. 1. The object relationship editor service is also operational over and processes within a network. The network may be wired, wireless, or a combination of wired and wireless.

As will be more fully described herein and below, the object relationship editor service permits a software module represented as an object to be defined, configured, edited, and instantiated on a machine via a configuration file. The configuration file includes a plurality of novel relationships and attributes that permit a variety features in a team-enabled and versioned processing environment.

At 110, the object relationship editor service creates a file that defines characteristics or a software module (object type of resource). The software module executes as instructions on a machine (such as a computer). Moreover, the software module is represented as an object. The characteristics include a variety of configuration and run-time instantiation information for the object. Some of these characteristics include relationships vis-à-vis other objects in a team-enabled project based environment and attributes for the object. The relationships can be viewed as dependencies.

According to an embodiment, at 111, the object relationship editor service interacts with a user (another type of resource) via an interface to define the characteristics included within the file. So, a user can custom define the characteristics via an interface that interacts with the object relationship editor service.

At 120, the object relationship editor service defines multiple relationships between the object and other objects, which are associated with the team-based project environment within the file.

The file is carried with the object, it may be embedded in the instructions of the object or it may be carried as metadata with the object. So, unlike conventional approaches the relationships between the object with respect to other objects are carried with the object. The file is not independent of the object; the file is in fact dependent and considered part of the object.

In an embodiment, at 121, the object relationship editor service includes with each relationship, which is defined within the file, a relationship type. A variety of relationship types can be defined for each relationship, such as: a parent and child relationship that incorporates another one of the other objects and its corresponding definition within the file; a reference type that points to one of the other objects; a contained reference that logically represents the parent and child relationship but that does not share storage with another one of the other objects to which it is associated; and a user-defined relationship to one of the other objects. So, each relationship is defined in the file of the object and each relationship includes a relationship type. The type indicates how it is that an object loader is to handle a particular relationship at runtime. For instance, the reference type may permit not loading another object that is referenced and may via policy simply raise a runtime warning to the user. Conversely, a parent-child type may include a physical dependency such that the dependent child or parent object has to be loaded before the object can be successfully processed and loaded. The contained reference type permits the logical benefits of a parent-child relationship but may permit one of the dependent objects in the relationship to not be loaded when the other object is loaded. Other situations can be defined via a user-defined type.

In an embodiment, at 122, the object relationship editor service automatically defines at least one relationship for the object within the file as a back reference relationship. The back reference relationship identifies one of the other objects that reference the object in a different file that defines the one of the other objects and its relationships. In other words, the processing environment can be inspected via the object relationship editor service and a determination made that another object, which is loaded and is processing, references the object being created or edited via the object relationship editor service. In such a situation, the relationship can be added by the object relationship editor service to the object that identifies that back reference. So, suppose object A is being defined via File A and object B is already loaded in the team-enabled project environment via File B and File B references object A; here, the object relationship editor service adds a relationship to A as a type called "back reference" and includes the reference to object B.

In another embodiment, at 123, the object relationship editor service defines at least one relationship that permits the object to share a profile or storage with that which is defined in another one of the other objects, which is available in the team-enabled project environment. So, profiles and storage can be shared via references made and relationships defined in the file of the object. This is convenient shorthand and leverages existing objects in the processing environment.

At 130, the object relationship editor service subsequently instantiates an instance of the object within the team-enabled project environment and configures that object on the machine in response to the relationships defined in the file.

In some cases, at 140, the object relationship editor service identifies at least one attribute associated with the object defined in the file that references another one of the other objects. So, a particular attribute and by way of example only, such as size, color, shape, behavior, can be configured to be that which is defined by another object of the team-enabled project environment. Again, this is extremely convenient to assign attributes based on a context associated with another object.

In a related embodiment, at 141, the object relationship editor service permits two attributes that have the same name to reference two different ones of the other objects. A particular one of the two attributes is selected in response to a processing context of the object at runtime. So as an example only, consider that the file can have two attributes defined for its size, each attribute pointing to a different object and the particular size defined based on a particular processing context of the object.

Some example illustrations and processing scenarios are now defined for purposes of further illustrating the object relationship editor service.

Most pieces of software use some sort of underlying data model to store its information. This information is usually store in one of three ways: a database, independent files; and/or highly-coupled files linked together.

One aspect that is significant in many business environments is to share that model information with fellow teammates and to let multiple people edit and change the underlying model, by interacting with it via a team-enabled application. For this to work in all of the above scenarios, the database or files are usually on a central machine. But, they can also be shared by copying the database or files for each instance.

The challenge that exists is that usually one wants some way to version the model at certain points in time so that one can return to it, for whatever reason. This object relationship editor service permits a mechanism for making this workable—the ability to version highly-coupled files that are linked together in a team environment.

Versioning and sharing files in a team environment that are connected in a web of relationships is very complex and is not a problem that has been adequately addressed in the industry.

The challenge is that if one has a web of objects with links that define relationships between those objects and each of those objects is basically stored in its own file, or is embedded within another object in a file, there is NO off-the-shelf version control system (like CVS, Subversion, etc.) that can practically work and ensure model integrity in a team or version-controlled environment. So, the processing of the object relationship editor service is needed to provide the storage and handling in such an environment to get the user the ability to have model integrity as he/she works with the model in a team environment.

It is noted herein that the phrases "team-enabled" and "version-controlled" are closely tied and are used interchangeable conceptually. This is because if one solves problems for one, one ends up solving it for the other via the processing of the object relationship editor service. In other words, there many scenarios for breakage in a model when sharing between two different people (users) and the processing of the object relationship editor service puts forth a mechanism to avoid these disasters. This same mechanism can also be applied to the principles behind version control when one may be versioning between version 5 of an object and version 10. If one is on version 10 of an object and decides to go back to version 5 and one didn't pull in associated objects, etc. one ends up with the same technical model integrity challenges that the object relationship editor service solves.

Object Modeling Relations

The first part is for all object relationships to be stored in a way so that the relationships are persisted in each object's file so that they can be successfully reconstructed. The architecture of the object relationship editor service is described and implemented generically so that it can apply to the broadest set of usages in the real world. The FIG. 5 diagram displays and captures a mechanism for defining how these objects can be tied together to define any type of object-to-object relationship.

Figure 5:
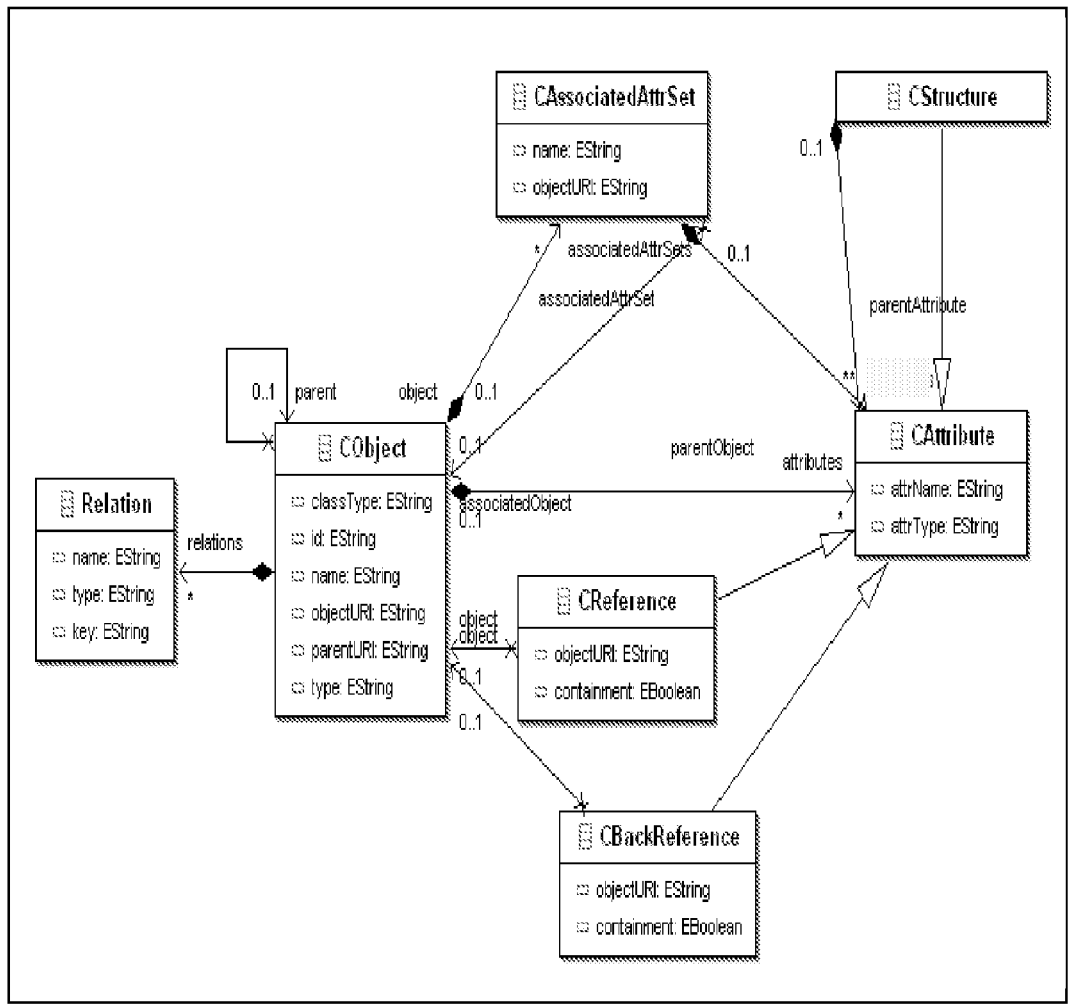
FIG. 5 is a diagram providing an example mechanism that displays and captures a technique for defining how objects can be tied together to define any type of object-to-object relationship.

Objects are represented by CObject in the FIG. 5. Here, another object is defined that represents the relationships and the nature of that relationship. There can be any number of relationship types. The ones that are most common and generic to describe most object model relationships are:

1. Parent/child—where one object physically contains another object—meaning, that if the parent object were to be deleted from the model, the child object would also go away.

2. Reference—where one object points to another object; in this case, if the one object was deleted, the other one would not be, just the relationship would go away.

3. Contained Reference—similar to the above, with the slight twist that for end-user modeling purposes, one wishes this relationship to be expressed visually and conceptually as a parent/child relationship, but its storage is not a true parent/child storage, so one has the same freedom where a delete of one object, will not cause the delete of the other.

4. User Defined—there can be any number of other "specific" types of relationships that make sense to any number of possible modeling domains that could leverage this Relation concept.

One can view the CObject conceptually as a concrete instance of an object in a model and its storage maps to one file. It may have some attributes that may individually store to separate supporting files, but the object, at minimum, stores to a file.

In this object's file, there are entries to list all of the various relations; each one could be a different type. One can have multiple relations of a given type. For example, one can have multiple child/parent relations—this just means that an object can have multiple children.

Serialization to Disk

Relationships are not hard-coded on to each different type of object or instance, but are generically defined in a way so that it can work for any type of object with any type or relation. And, the mechanism permits relationships to be serialized and de-serialized to and from disk. The storage of this can be expressed in extensible Markup Language (XML), such as the following:

```
<Object name="Foo" type="A">
<relations name="SharedProfile" type="Reference" key="B"/>
<relations name="Schema" type="Child" key="C"/>
<relations name="Servers" type="ContainedReference" key="D"/>
<relations name="DriverSets" type="ContainedReference" key="E"/>
<relations name="Collections" type="ContainedReference" key="F"/>
</Object>
```

This illustration includes shows a key that points to another object.

Modeling Back References

Obviously, for a model to have integrity in a team environment, it is not enough to model references, but also back references, but without a good mechanism this can quickly turn into a mess and then you have a model that quickly breaks down in a team environment and/or version controlled environment.

So, the object relationship editor service has the notion of a Relationship Manager (also discussed below) that makes sure that back reference relations get added to a target object whenever a reference relation is created. And, when the relationship goes away, that is cleaned up. Using the above example, object A is pointing to object B. If one were to look at object's B's file, one would see a BackReference relation that points back to A.

```
<Object name="Foo2" type="B">
    <relations name="ABackRef" type="BackReference" key="A"/>
</Object>
```

Modeling Attributes that Point to Objects

The above diagram illustrates how this mechanism allows for objects to contain attributes, which in turn can point to other objects. This is another form of creating a reference relationship, though this is not treated as a first-class object-to-object relationship with automatic back reference handling. It's merely a convenience for allowing an attribute to point to another object.

Modeling Embedded Objects

An embedded object is an object that is physically embedded in another object, so when the object serializes to file, it serializes in the same file within the object. One way to do this is to have an object build an "Embedded" relation with another object. Another way is to have an object which has an attribute that is of type Structure; this structure can behave as an object, but it is not a first-class object that can have relations. The serialization is the following:

```
<Object name="Foo" type="A">
    <relations name="SharedProfile" type="Reference" key="B"/>
    <relations name="Schema" type="Child" key="C"/>
    <relations name="Servers" type="ContainedReference" key="D"/>
    <relations name="DriverSets" type="ContainedReference" key="E"/>
    <relations name="Collections" type="ContainedReference" key="F"/>
    <Object name="Foo3" type="Z">
<relations name="SharedProfile" type="Reference" key="B"/>
    <relations name="CBackRef" type="BackReference" key="C"/>
    </Object>
</Object>
<Object name="Foo4" type="C">
    <relations name="SharedProfile" type="Reference" key="B/Z"/>
</Object>
```

The above illustration shows the following two concepts:
1. Object A embeds Object Z
2. Object C points to Object Z, which is embedded in Object B and is able to have a back reference out from its embedded position to top-level Object C.

Modeling Associated Objects

This provides novel modeling capability. This technique is that an object can have attributes that belong to itself but pertain (or is associated) with another object.

Example:
Object A
Size: Object B
Shape: Object B
Color: Object B
Size: Object C
Shape: Object C
Color: Object C Object A has two Size attributes. One size is vis-à-vis object B, and the other is vis-à-vis object C. The collection of attributes that are associated with another object, is called an AssociatedAttrSet. A practical example is one can have a Car that has a max speed of 50, when driver A is in the car, but a speed of 65, when driver B is in the car (or the position of the mirrors, seat, etc.). This technique allows for such a relationship to be modeled and modeled in a way so that it can be shared in a team environment and versioned.

Loading the Model into Memory (Discussed More Completely Below with Reference to Method 200 and the FIG. 2)

It has now been described how a team-enabled model can be modeled and serialized. The next step is to describe how it can be de-serialized, or loaded back into memory. The model load mechanism can start with ANY object in the graph of objects, not just the top object. It can start with the bottom object, or anywhere in between. This is a substantial improvement over past and conventional approaches.

When the object is loaded, all of its attributes and relationships are then de-serialized into native object fields. When, based on some user or system event, the model can load more deeply (e.g. follow up a parent path, child path, or traverse a reference or backreference path), the model-loading mechanism can just study the relation object that it's trying to traverse and load the object accordingly, and thus be able to go from object to object dynamically at run-time as needed. The object relationship editor service demonstrates in a novel approach how the object model relationships are defined, serialized to disk, and then can be de-serialized in a practical way that actually works for a team-enabled environment.

Figure 2:
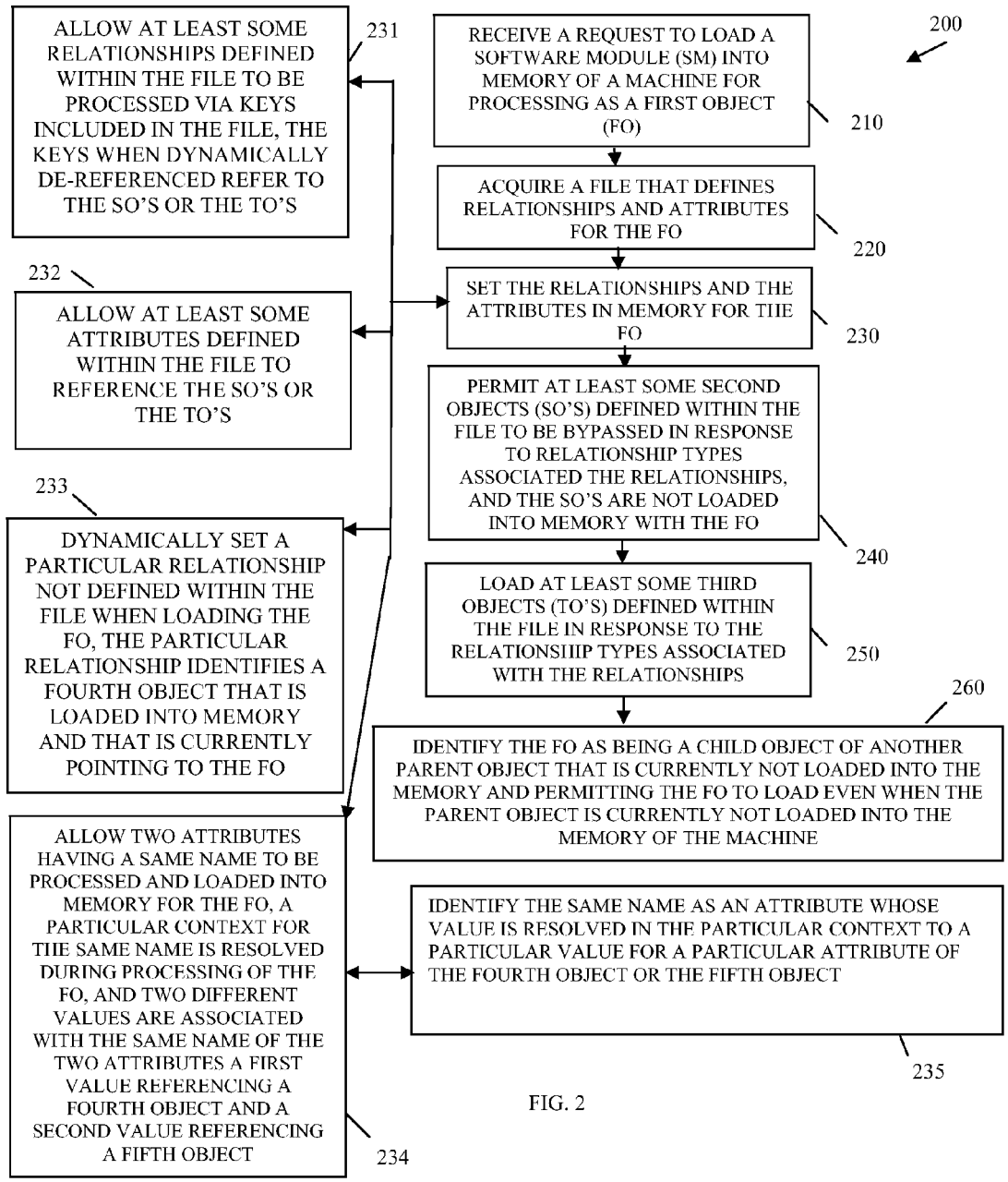
FIG. 2 is a diagram of another method for managing complex object dependencies in a team-based project environment, according to an example embodiment.
Figure 3:
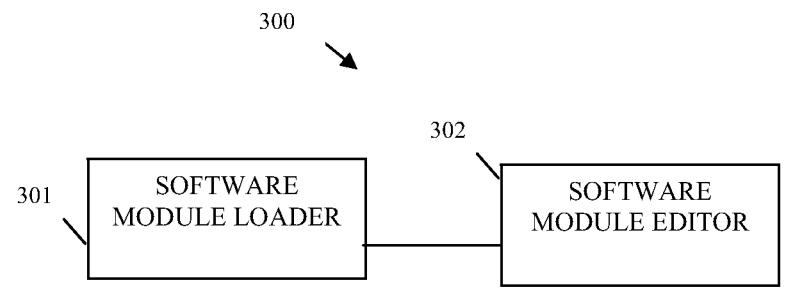
FIG. 3 is a diagram of an object-dependencies management system, according to an example embodiment.
Figure 4:
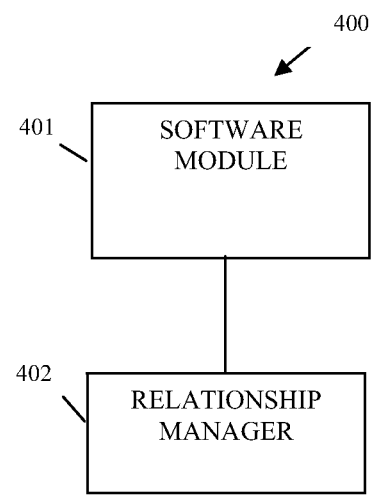
FIG. 4 is a diagram of another object-dependencies management system, according to an example embodiment.

Various aspects and variations on the approaches discussed above are now presented with reference to the FIGS. 2-4.

FIG. 2 is a diagram of another method 200 for managing complex object dependencies in a team-based project environment, according to an example embodiment. The method 200 (hereinafter "object loading service") is implemented as instructions in a machine-accessible and readable medium. The instructions when executed by a machine perform the processing depicted in the FIG. 2. The object loading service is also operational over and processes within a network. The network may be wired, wireless, or a combination of wired and wireless.

The object loading service represents back-end processing associated with object relationship editor service represented by the method 100 discussed above with the FIG. 1. In other words, the object loading service is used to load and dynamically manage relationships and attributed defined, edited, and created by the object relationship editor service.

At 210, the object loading service receives a request to load a software module into memory of a machine for processing a first object as the software module. The request can be received in response to a variety of situations. A manual request can be received from a user. Alternatively, the request can be generated in response to another object being loaded that needs to have the first object loaded to process successfully (a hard dependency). In fact, any condition defined in an event or policy can be used to generate the request for loading the first object.

At 220, the object loading service acquires a file that defines relationships and attributes for the first object. The mechanism and techniques for creating and editing the file and its direct association with the first object was presented and described in detail above with reference to the method 100 of the FIG. 1.

At 230, the object loading service sets the relationships and the attributes in memory for the first object. That is, memory is configured and set aside for handling the structure of the first object when it processes on the machine. Hard dependencies are resolved and other objects loaded if needed and soft dependencies are permit to proceed without necessarily loading referenced objects.

According to an embodiment, at 231, the object loading service allows at least some relationships defined within the file to be processed via keys included in the file. The keys when dynamically de-referenced refer to other second objects or third objects. In other words, keys can be used in the file to refer to external objects and the keys can be resolved to specific files associated with specific external objects. This is convenient in the event that names for objects change or locations change, the key can be used to generically refer to those objects and resolve them at run time or load time as needed.

In another case, at 232, the object loading service allows at least some attributes defined within the file to reference the second objects or the third objects. In other words, attributes that define properties of the first object, such as but not limited to size, color, behavior, etc. can be defined in the file for the first object via a reference to another object. The value assigned to the property (attribute) is resolved based on what the value is for the object assigned in the file. This was discussed in detail above with reference to the method 100 of the FIG. 1.

In still another case, at 233, the object loading service dynamically sets a particular relationship not defined within the file when loading the first object. The particular relationship identifies a fourth object that is loaded into memory and that is currently pointing to the first object. In other words, the object loading service detects that a fourth loaded object within the team-enabled project environment includes a reference to the first object. In response to this situation, the object loading service includes a back reference within the loaded version of the file for the first object that provides a back pointer to the fourth object. Again, this situation and examples related thereto were described in detail above with reference to the method 100 of the FIG. 2.

According to an embodiment, at 234, the object loading service allows two attributes to have a same name within the file and each to be processed and loaded into memory for the first object. A particular processing context for the same name is resolved during processing of the first object. Two different attribute values are associated with or assigned to the same name and duplicated attribute within the file. A first value for a first instance of the same name references a fourth object and a second value for a second instance of the same name references a fifth object. The specific value assigned to the same name attribute is resolved based on the runtime processing context of the first object. Examples associated with this were described in detail above with reference to the method 100 of the FIG. 1.

Continuing with the embodiment at 234 and at 235, the object loading service identifies the same name as an attribute associated with a size, shape, or color property (this is by way of example only) that is to be assigned to the first object. The resolution of the value assigned to the first object property is again in the particular context to a value for the size, shape, or color property of the fourth or fifth object.

At 240, the object loading service permits at least some second objects defined within the file to be bypassed in response to relationship types associated with the relationships. So, the second objects are not loaded into memory with the first object. Policy may drive the actions of the object loading service such that a warning can be issued or warnings can be turned off by users when second objects are not loaded. The second objects are not loaded with the relationship types permit the first object to be loaded without the second objects and when the second objects are not available for loaded or not already loaded.

At 250, the object loading service loads at least some third objects defined within the file in response to the relationship types associated with the relationships. Here, the loaded third objects may be embedded within the file of the first object or may be hard dependencies identified via the relationship types that the object loading service cannot ignore when loading the first object, such that these third objects have to loaded when loading the first object.

In an embodiment, at 260, the object loading service identify the first object as being a child object of another parent object that is currently not loaded into the memory and permits the first object to load even when the parent object is currently not loaded into the memory of the machine. In other words, the objects can be loaded in any order within the machine, such that child or leaf nodes of a hierarchy of objects can be loaded first and before the dependent parents are loaded. A discussion of this was presented above with reference to the method 100 of the FIG. 1.

FIG. 3 is a diagram of an object-dependencies management system 300, according to an example embodiment. The object-dependencies management system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The object-dependencies management system 300 is also operational over a network and the network may be wired, wireless, or a combination of wired and wireless.

The object-dependencies management system 300 includes a software module loader 301 and a software module editor 302. Each of these components and their interactions with one another will now be discussed in turn.

The software module loader 301 is implemented in a machine-accessible and a computer-readable storage readable medium and is to process on a machine within of the network. Example processing associated with the software module loader 301 was described in detail above with reference to the object loader service represented by the method 200 of the FIG. 2.

The software module loader 301 accesses files associated with software modules (objects). Each file defines attributes and relationships for a particular one of the software modules. Moreover, each file is carried with or embedded within each software module to which it is associated. At least one relationship for each file references a different one of the software modules that is not associated with that particular file being loaded by the software module loader 301. So, each software module via its file includes a complex web of other object dependencies defined via the relationships and attributes.

Furthermore, at least one attribute is defined in each file via a particular reference to another one of the software modules. That is, properties that are to be set by the software module loader 301 can be resolved at runtime or load time by reference to another and different software module.

The software module loader 301 uses each file to load a particular software module into memory with the relationships and attributes.

In an embodiment, at least one file includes a duplicated attribute. Each instance of the duplicated attribute references a different one of the software modules.

In still another situation, at least one file includes a particular relationship that shares a storage structure with a different one of the software modules from that which is associated with the file. So, structure can be shared via references and reference types identified in the file.

According to an embodiment, the software module loader 301 includes a particular relationship with a loaded version of a particular software module that identifies a reference that a different one of the software modules has that reference the particular software module. So, the different software module is loaded into memory and references the particular software module being loaded. In this case, a back reference for the particular software module being loaded is included to point to the different software module.

The software module editor 302 is implemented in a machine-accessible and computer-readable storage medium and is to process on the same machine as the software module loader 301 or an entirely different machine of the network. Example processing associated with the software module editor was presented in detail above with reference to the method 100 of the FIG. 1.

The software module editor 302 is used to create the files and edit the relationships and the attributes defined in the files.

In an embodiment, the software module editor 302 manages the files defining the software modules in a team-based and project-based software processing environment. The software module editor 302 also permits versioning of the files and the software modules.

FIG. 4 is a diagram of another object-dependencies management system 400, according to an example embodiment, according to an example embodiment. The object-dependencies management system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The object-dependencies management system 400 is also operational over a network and the network may be wired, wireless, or a combination of wired and wireless.

The object-dependencies management system 400 includes a software module 401 and a relationship manager 402. Each of these components and their interactions with one another will now be discussed in turn.

The software module 401 is implemented in a machine-accessible and computer-readable storage medium and is to process on a machine within the network.

A configuration for the software module 401 is defined in a configuration file. The configuration file is embedded within the software module 401 or carried with the software module 401 as metadata. The configuration file defines relationships and attributes for the software module 401 when the software module 401 is loaded and processed within the machine (such as a computer).

According to an embodiment, each relationship is associated with a relationship type. Each relationship type is one of the following: a parent and child type that physically includes a dependency to another software module; a reference type that logically points to another software module; a contained reference type that includes a logical parent and child dependency: and a user-defined type that customizes a particular relationship in response to user-defined criteria.

In an embodiment, at least one relationship type and relationship defined within the configuration file permits the software module 401 to share structure with another different software module of the team-based project environment.

The relationship manager 402 is implemented in a machine-accessible and computer-readable storage medium and is to process on the same machine as the software module 401 or an entirely different machine of the network. Example processing associated with the relationship manager was described in various aspects above with reference to the methods 100 and 200 of the FIGS. 1 and 2, respectively, and with respect to the system 300 of the FIG. 3.

The relationship manager 402 establishes the relationships and sets values for the attributes via definitions included in the configuration file. At least one relationship identifies a different software module and at least one attribute is set via a reference to still another different software module. So, the software module 401 carries via its configuration file its complex web of dependencies to other software modules that process within the team-based project environment.

In an embodiment, the relationship manager 402 issues a warning when some software modules referenced in the configuration file as particular relationships are not available to the software module 401. However, the relationship manager 402 permits the software module 401 to load and process in spite of this situation. Thus, loosely coupled and defined dependencies within the configuration file can be ignored when loading and processing the software module 401. This permits a lot of flexibility in a project environment, since developers relying on the software module 401 to do work can proceed even when some dependent modules are not available when the developers want to do the work.

In another case, the relationship manager 402 halts loading the software module 401 when a particular relationship includes an embedded reference to another software module associated with a hard dependency. This can be when the software module 401 shares structure with the unavailable module and the relationship type for the particular relationship indicates that it is a hard dependency.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method of managing object dependencies in a team-based project environment, comprising:
   creating a first file that defines characteristics of a software module that executes as instructions on a machine, wherein the software module is represented as a first object, the first file being carried by the first object and being particular to said first object;
   defining within said first file multiple relationships between the first object and other second objects associated with said team-based project environment, each of said second objects having its own second file that is particular to such second object and that defines other relationships of said each second object, and defining within the first file attributes of said first object having attribute values defined by one or more third objects; and subsequently instantiating an instance of the first object within the team-based project environment and configuring the first object on the machine in response to the relationships and attributes defined in the first file; and instantiating instances of one or more of said second and third objects based upon the relationships and attributes defined in the first file of the first object.

2. The method of claim 1, wherein creating further includes interacting with a user via an interface to define the characteristics included in the first file.

3. The method of claim 1, wherein defining further comprises including with each relationship defined within the first file a relationship type that includes one of the following: a parent and child relationship that incorporates another one of the other objects and its definition within the file, a reference that points to one of the other objects, a contained reference that logically represents the parent and child relationship but does not share storage with another one of the other objects to which it is associated, and a user-defined relationship to one of the other objects.

4. The method of claim 1, wherein defining further includes automatically defining at least one relationship for the first object within the first file as a back reference relationship, wherein the back reference relationship identifies one of the other objects that references the first object in a different file that defines that one other object and its relationships.

5. The method of claim 1, wherein defining further includes defining at least one relationship that permits the first object to share a profile with that which is defined for another one of the other objects.

6. The method of claim 1 further comprising identifying at least one attribute associated with the first object and defined in the first file to reference another one of the other objects.

7. The method of claim 6, wherein identifying further includes permitting two attributes having a same name to reference two different ones of the other objects, wherein a particular one of the two attributes is selected in response to a processing context of the first object at run time.

8. A method of managing object dependencies in a team-based project environment, comprising:

receiving a request to load a software module into memory of a machine for processing as a first object;

acquiring a first file carried by and particular to the first object that defines relationships of the first object to second objects and defines attributes for the first object having values set by other objects;

setting the relationships and the attributes in memory for the first object;

permitting at least some second objects defined within the first file to be bypassed in response to relationship types associated with the defined relationships, and wherein the second objects are not loaded into memory with the first object; and loading at least some third objects defined within the first file in response to the relationship types associated with the relationships and in response to attributes defined in the first file.

9. The method of claim 8, wherein setting further includes allowing at least some relationships defined within the file to be processed via keys included in the file, wherein the keys when dynamically de-referenced refer to the second objects or the third objects.

10. The method of claim 8, wherein setting further includes allowing at least some attributes defined within the file to reference the second objects or the third objects.

11. The method of claim 8, wherein setting further includes dynamically setting a particular relationship not defined within the file when loading the first object, wherein the particular relationship identifies a fourth object that is loaded into memory and that is currently pointing to the first object.

12. The method of claim 8, wherein setting further includes allowing two attributes having a same name to be processed and loaded into memory for the first object, wherein a particular context for the same name is resolved during processing of the first object, and wherein two different values are associated with the same name of the two attributes a first value referencing a fourth object and a second value referencing a fifth object.

13. The method of claim 12, wherein allowing further includes identifying the same name as an attribute whose value is resolved in the particular context to a particular value for a particular attribute of the fourth object or the fifth object.

14. The method of claim 8 further comprising, identifying the first object as being a child object of another parent object that is currently not loaded into the memory and permitting the first object to load even when the parent object is currently not loaded into the memory of the machine.

15. A machine-implemented system for managing object dependencies in a team-based project environment, comprising:

a software module loader implemented in a machine-accessible and readable non-transitory medium and to process on a machine within a network; and a software module editor implemented in a machine-accessible and readable non-transitory medium and to process on the machine or a different machine of the network;

wherein the software module loader is to access files associated with a plurality of software modules, each software module having its own file that is particular to and carried by the software module and that defines attributes and relationships for the software module, and wherein at least one relationship defined by each file references a different one of the software modules not associated with that particular file, and wherein at least one value for at least one attribute is defined in each file via a reference to another one of the software modules, and the software module loader uses each file to load software modules into memory based upon the relationships and the attributes, and the software module editor is used to create the files and edit the relationships and the attributes defined in the files.

16. The system of claim 15, wherein at least one file includes a duplicated attribute, wherein each instance of the duplicated attribute references a different one of the software modules.

17. The system of claim 15, wherein at least one file includes a particular relationship that shares a storage structure with different one of the software modules from that which is associated with the file.

18. The system of claim 15, wherein the files defining the software modules are managed by the software module editor in a team-based and project-based software processing environment.

19. The system of claim 15, wherein the software module editor provides version management of the files.

20. The system of claim 15, wherein the software module loader includes a particular relationship with a loaded version of particular software module that identifies a reference that a different one of the software modules has that references the particular software module.

21. A system for managing object dependencies in a team-based project environment, comprising:
- a first software module represented as an object that is implemented in a machine-accessible and readable non-transitory medium and that processes on a machine of a network; and
- a relationship manager implemented in a machine-accessible and readable non-transitory medium and to process on the machine or a different machine of the network;
- wherein a configuration for the first software module is defined in a configuration file that is carried by and is particular to said first software module, the configuration file defining relationships between the first software module and one or more second software modules and defining attributes for the first software module when it processes on the machine, and wherein the relationship manager establishes the defined relationships and sets values for the defined attributes by reference to one or more third software modules via definitions included in the configuration file.

22. The system of claim 21, wherein each relationship is associated with a relationship type and each relationship type is one of the following: a parent and child type that physically includes a dependency to another software module, a reference type that logically points to another software module, a contained reference type that includes a logical parent and child dependency, and a user-defined type that customizes a particular relationship in response to a user-defined criteria.

23. The system of claim 21, wherein the relationship builder issues a warning when some software modules referenced in the file as particular relationships are not available to the software module but permits the software module to load and process anyway.

24. The system of claim 21, wherein the relationship builder halts loading the software module when a particular relationship includes an embedded reference to another software module.

25. The system of claim 21, wherein at least one relationship permits the software module to share structure with another software module.

* * * * *